UNITED STATES PATENT OFFICE.

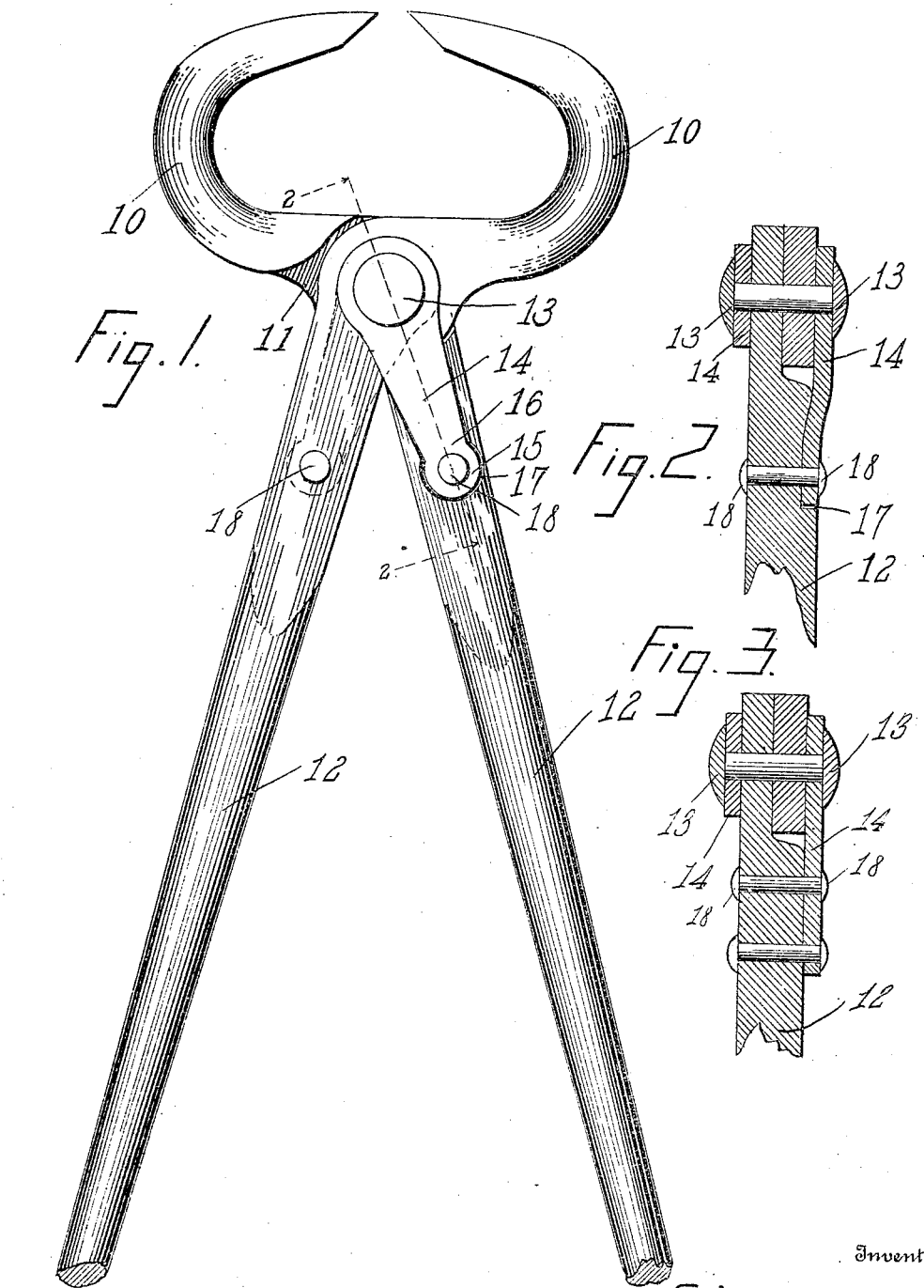

ELI JONES, OF VALLEY SPRINGS, SOUTH DAKOTA.

NIPPERS AND PINCERS.

951,076.          Specification of Letters Patent.          Patented Mar. 1, 1910.

Application filed May 26, 1909. Serial No. 498,496.

*To all whom it may concern:*

Be it known that I, ELI JONES, a citizen of the United States, residing at Valley Springs, in the county of Minnehaha, State of South Dakota, have invented certain new and useful Improvements in Nippers and Pincers; and I do hereby declare the following to be a full, clear, and exact description of the invention, such as will enable others skilled in the art to which it appertains to make and use the same.

This invention relates to nippers and pincers of the kind used by blacksmiths and farriers.

The principal object of the invention is to improve the general construction of nippers and pincers.

Another object of the invention is to so strengthen the ordinary type of lap handle nippers or pincers that the rivet connecting the two parts of the handle may be brought into double shear in place of the usual single shear, usual in such devices.

With the above and other objects in view, the invention consists of a pair of nippers or pincers having lap handles provided with novel means for holding the rivet in double shear.

The invention further consists in certain novel details of arrangement and combination of parts hereinafter fully described, illustrated in the accompanying drawing, and specifically set forth in the claim.

In the accompanying drawings, like characters of reference indicate like parts in the several views, and:—Figure 1 is a side view of a pair of nippers constructed in accordance with this invention. Fig. 2 is a section on the line 2—2 of Fig. 1. Fig. 3 is a section of a modified form of the device.

In the form here shown the device is indicated as applied to a pair of ordinary cutting nippers such as are used by blacksmiths and farriers and which are provided with a pair of jaws 10 flattened adjacent the joint as indicated at 11 and each provided with a handle portion 12. These nippers are of the ordinary lap joint type in which one of the joint portions is laid upon the other and a rivet fastened through a suitable hole in the tool.

The rivet is here indicated by the numeral 13 and in place of closely engaging the joint 11 of each of the members there is provided a plate 14 on each member through which the rivet passes. The plate 14 is formed so that it projects over the member, between which and the head of the rivet 13 it is carried and extends backward, terminating in an enlarged end 15, connected to the body by a narrow portion 16. The inner side of the other handle member 12, is recessed as at 17 and so arranged that the portion 15 and neck 16 are held in this recess. In order to retain the end 15 of the recess a rivet 18 is riveted through the end and the handle member thus preventing accidental displacement of the end 15 from the recess 17.

By means of this construction it will be apparent that the end 15 bears against the side of the recess adjacent to the rivet 13 so that all the strain is relieved from the rivet 18, which may be made relatively small on that account. It will thus be seen that each of the portions 11 of the nipper members is held between one of the plates 14 and the other portion 11 of the other nipper member. In this manner the rivet 13 is at all times brought into double shear and the strength proportionately increased.

In Fig. 3 is illustrated a modification of the invention wherein the plate 14 is straight and is held upon the flat surface of the handle 12 by means of a pair of rivets 18. It will be further noted that the stress on the plate 14 is brought to bear directly on the handle 12 by reason of the fact that enlarged part 15 of the plate fits closely in the recess 17.

There has thus been provided a simple and efficient device of the character described and for the purpose specified.

It is obvious that minor changes may be made in the form and proportion of this invention without departing from the material principle thereof. It is not therefore desired to confine the invention to the exact form herein shown and described, but it is wished to include all such as come properly within the scope of the appended claim.

Having thus described the invention, what is claimed as new is:—

In a tool of the class described, a joint comprising two superposed handle members having a rivet extending therethrough, the handle of each of said members being provided with a recess on the inner face having an enlarged portion, plates each attached to one end of the rivet on the outside of one of said members and each of said plates being provided with an enlarged head fitted in the enlarged portion of the recess of the handle to which it is attached, and means to retain the said plate in said recess.

In testimony whereof, I affix my signature, in presence of two witnesses.

ELI JONES.

Witnesses:
L. S. HETLAND,
L. C. HETLAND.